United States Patent
Laur et al.

(10) Patent No.: US 9,604,639 B2
(45) Date of Patent: Mar. 28, 2017

(54) PEDESTRIAN-INTENT-DETECTION FOR AUTOMATED VEHICLES

(71) Applicant: DELPHI TECHNOLOGIES, INC., Troy, MI (US)

(72) Inventors: Michael H. Laur, Mission Viejo, CA (US); Serge Lambermont, Maastricht (NL)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/838,826

(22) Filed: Aug. 28, 2015

(65) Prior Publication Data
US 2017/0057497 A1 Mar. 2, 2017

(51) Int. Cl.
*B60W 30/09* (2012.01)
*B60W 40/02* (2006.01)

(52) U.S. Cl.
CPC ............ *B60W 30/09* (2013.01); *B60W 40/02* (2013.01); *B60W 2420/42* (2013.01); *B60W 2420/52* (2013.01); *B60W 2550/10* (2013.01)

(58) Field of Classification Search
CPC .. B60W 30/09; B60W 40/02; B60W 2550/10; B60W 2420/52; B60W 2420/42
USPC ............................................ 701/23, 36, 301
See application file for complete search history.

(56) References Cited

U.S. PATENT DOCUMENTS

| | | | | |
|---|---|---|---|---|
| 5,475,494 A * | 12/1995 | Nishida | ................. | G01S 17/936 180/169 |
| 6,882,916 B2 * | 4/2005 | Takafuji | ................. | B60R 19/48 280/735 |
| 7,130,448 B2 * | 10/2006 | Nagaoka | ............ | G06K 9/00362 340/435 |
| 7,143,856 B2 * | 12/2006 | Takahashi | ............. | B60R 21/013 180/271 |
| 7,317,380 B2 * | 1/2008 | Ozaki | ................... | B60Q 1/085 340/425.5 |
| 7,353,087 B2 * | 4/2008 | Takafuji | ............. | B60R 21/0136 280/728.1 |
| 7,379,813 B2 * | 5/2008 | Kubota | ................ | G08G 1/0962 701/300 |
| 7,543,677 B2 * | 6/2009 | Igawa | ................. | B60R 21/0134 180/274 |

(Continued)

FOREIGN PATENT DOCUMENTS

KR   10-2013-0068626 A   6/2013
KR   10-2014-0071121 A   6/2014

*Primary Examiner* — Tyler J Lee
(74) *Attorney, Agent, or Firm* — Lawrence D. Hazelton

(57) ABSTRACT

A pedestrian-intent-detection system for automated operation of a host-vehicle (e.g. automated vehicle) includes an object-detection device and a controller. The object-detection device is operable to detect an object proximate to a host-vehicle. The controller is in communication with the object-detection device. The controller is configured to determine when the object detected by the object-detection device is a pedestrian based on a detection-characteristic of the pedestrian indicated by the object-detection device. The controller is further configured to define a size of a caution-area located proximate to the pedestrian based on a behavior-characteristic (e.g. intent) of the pedestrian indicated by the object-detection device. The controller is further configured to operate (e.g. brake, steer) the host-vehicle in order to avoid the caution-area.

14 Claims, 3 Drawing Sheets

(56) References Cited

U.S. PATENT DOCUMENTS

| | | | |
|---|---|---|---|
| 7,576,639 B2* | 8/2009 | Boyles | G06K 9/00369 340/425.5 |
| 7,598,848 B2* | 10/2009 | Takagi | G06K 9/00805 180/275 |
| 7,734,393 B2* | 6/2010 | Murakami | B60R 21/0136 293/120 |
| 7,737,833 B2* | 6/2010 | Takafuji | B60R 21/0132 180/274 |
| 7,786,898 B2* | 8/2010 | Stein | B60R 1/00 340/436 |
| 8,005,266 B2* | 8/2011 | Saka | G06K 9/00369 348/118 |
| 8,175,331 B2* | 5/2012 | Nagaoka | B60W 40/04 382/103 |
| 9,373,042 B2* | 6/2016 | Ogawa | G08G 1/166 |
| 2003/0138133 A1* | 7/2003 | Nagaoka | G06K 9/00362 382/104 |
| 2005/0182540 A1* | 8/2005 | Sugiura | B60R 21/0136 701/41 |
| 2008/0260207 A1* | 10/2008 | Nagaoka | G06T 7/0002 382/103 |
| 2009/0143987 A1 | 6/2009 | Bect et al. | |
| 2010/0027378 A1 | 2/2010 | Sabatier et al. | |
| 2011/0064275 A1* | 3/2011 | Nagaoka | G06K 9/00369 382/106 |
| 2014/0022110 A1* | 1/2014 | Itohara | G01S 7/295 342/107 |
| 2015/0032290 A1 | 1/2015 | Kitahama et al. | |
| 2015/0049908 A1* | 2/2015 | Ogawa | G08G 1/166 382/103 |
| 2015/0329044 A1* | 11/2015 | Bernstein | G08G 1/165 340/435 |

* cited by examiner

PEDESTRIAN-INTENT-DETECTION FOR AUTOMATED VEHICLES

TECHNICAL FIELD OF INVENTION

This disclosure generally relates to a pedestrian-intent-detection system for automated operation of a host-vehicle, and more particularly relates to a system that defines a size of a caution-area located proximate to a pedestrian based on a behavior-characteristic of the pedestrian indicated by an object-detection device.

BACKGROUND OF INVENTION

It is known to detect objects proximate to a host-vehicle in order to warn a driver of the host-vehicle, or aid an automated-vehicle with path-planning. However, while a stationary object is expected to remain fixed at a location, mobile objects such as pedestrians and animals may begin to move or may already be moving which makes path-planning more difficult.

SUMMARY OF THE INVENTION

In accordance with one embodiment, a pedestrian-intent-detection system for automated operation of a host-vehicle is provided. The system includes an object-detection device and a controller. The object-detection device is operable to detect an object proximate to a host-vehicle. The controller is in communication with the object-detection device. The controller is configured to determine when the object detected by the object-detection device is a pedestrian based on a detection-characteristic of the pedestrian indicated by the object-detection device. The controller is further configured to define a size of a caution-area located proximate to the pedestrian based on a behavior-characteristic of the pedestrian indicated by the object-detection device. The controller is further configured to operate the host-vehicle in order to avoid the caution-area.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
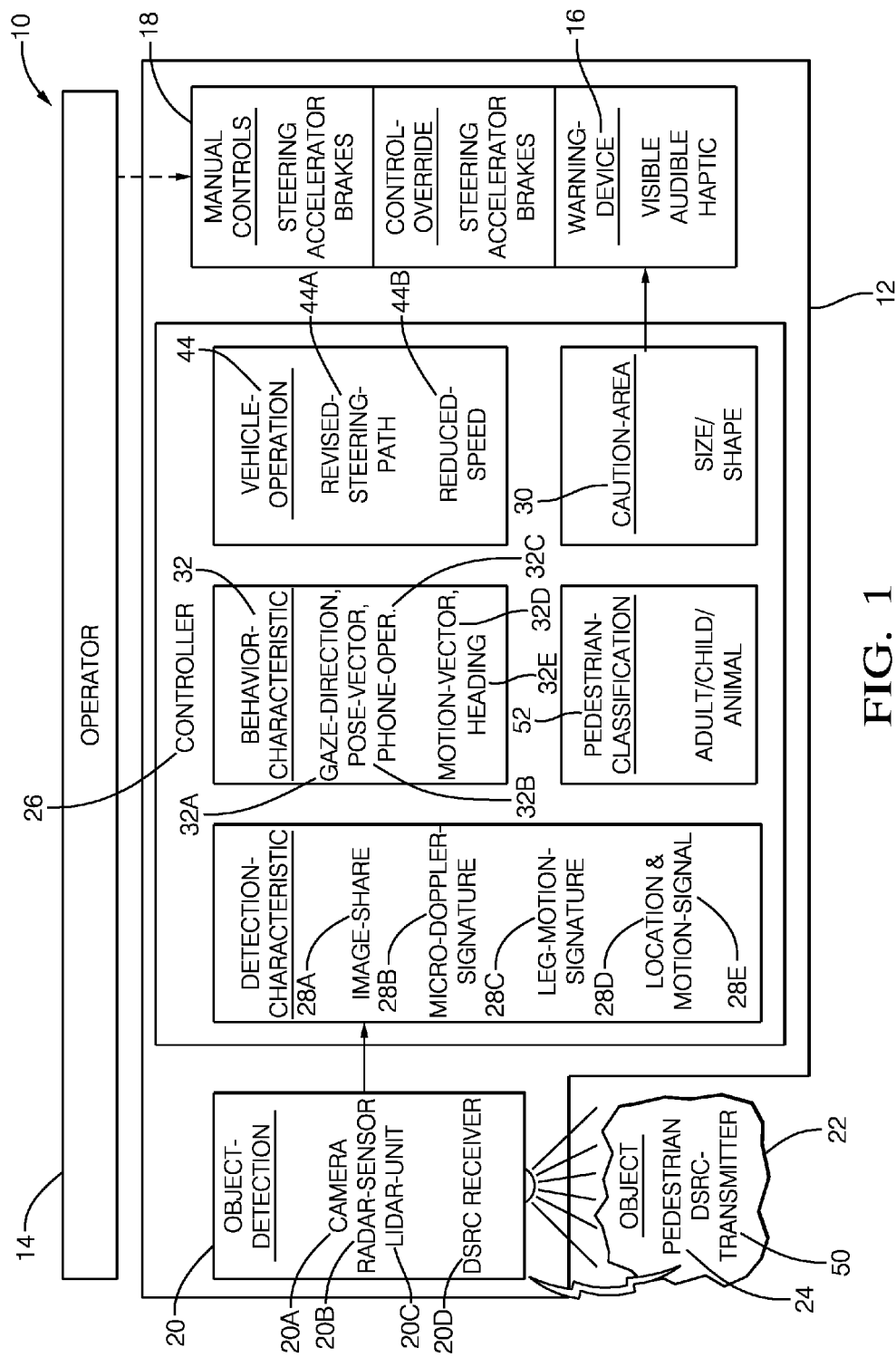
FIG. 1 is a diagram of a pedestrian-intent-detection system for automated operation of a host-vehicle, in accordance with one embodiment.

FIG. 1 illustrates a non-limiting example of a pedestrian-intent-detection system, hereafter the system 10, for automated operation of a host-vehicle 12. The host-vehicle 12 may be a fully automated vehicle, i.e. an autonomous vehicle, or the host-vehicle maybe driven by an operator 14. In the latter case, the system 10 described herein provides assistance to the operator 14 to drive the host-vehicle 12, where the assistance may be merely activating a warning-device 16, or may include temporarily taking-over control of the vehicle-controls 18 that are used by the operator 14 and/or the system 10 to control steering, acceleration, and braking of the host-vehicle 12.

The system 10 includes an object-detection device 20 that is generally operable to detect an object 22 proximate to a host-vehicle 12. The object-detection device 20 may include any one or combination of, but not limited to, a camera 20A, a radar-sensor 20B, a lidar-sensor, and/or a dedicated-short-range-communications receiver, hereafter the DSRC-receiver 20D. As will be explained in more detail below, each of these individual devices has certain detection strengths with regard to detecting and/or classifying an object as, for example, the pedestrian 24. Furthermore, certain combinations of these individual devices provide for a synergistic interaction to improve the ability of the system 10 to more accurately identify the pedestrian 24 and determine some sort of prediction about the intent of the pedestrian 24.

As will also be explained in more detail, the system 10 described herein is generally configured to distinguish stationary objects like signs and lampposts from potentially mobile objects such as a pedestrian 24, e.g. a person or an animal such as a pet or wildlife. The system 10 is further configured to determine various details about a detected pedestrian, and based on those details predict to what extent the host-vehicle 12 will need to alter a planned or straight-ahead steering-path in order to avoid or give-way to the pedestrian 24 if the pedestrian should happen to move into or toward the previously planned steering-path of the host-vehicle 12.

The system 10 includes a controller 26 in communication with the object-detection device 20. The controller 26 may include a processor (not specifically shown) such as a microprocessor or other control circuitry such as analog and/or digital control circuitry including an application specific integrated circuit (ASIC) for processing data or signals from the object-detection device 20, as should be evident to those in the art. The controller 26 may include memory (not specifically shown), including non-volatile memory, such as electrically erasable programmable read-only memory (EEPROM) for storing one or more routines, thresholds, and captured data. The one or more routines may be executed by the processor to perform steps for determining if signals received by the controller 26 from the object-detection device 20 can be used to determine the intent of the pedestrian 24 as described herein. In other words, the system 10, or more specifically the controller 26, described herein is configured to determine the likelihood that a pedestrian 24 might move into, toward, or close to the travel-path of the host-vehicle 12, and take some precautionary or evasive action to avoid or reduce the risk of a collision between the host-vehicle 12 and the pedestrian 24.

To this end, the controller 26 is generally configured to determine when the object 22 detected by the object-detection device 20 is a pedestrian 24 based on a detection-characteristic 28 of the pedestrian 24 indicated by the object-detection device 20. As used herein, the detection-characteristic 28 of the pedestrian is some aspect of the pedestrian 24 that can be measured or indicated depending on which one or combination of the individual devices (e.g. the camera 20A, the radar-sensor 20B, the lidar-sensor and/or the DSRC-receiver 20D) are provided. It is contemplated that the detection-characteristic 28 may be determined or based on deep learning techniques. Deep learning (deep machine learning, or deep structured learning, or hierarchical learning, or sometimes DL) is a branch of machine learning based on a set of algorithms that attempt to model high-level abstractions in data by using model architectures, with complex structures or otherwise, composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., face recognition or facial expression recognition) from examples. The techniques for deep learning may include unsupervised or semi-supervised feature learning and hierarchical feature extraction.

The controller 26 is further generally configured to define a size and/or shape of a caution-area 30 (FIG. 2) located proximate to the pedestrian 24 based on a behavior-characteristic 32 of the pedestrian 24 indicated by the object-detection device 20, and operate the host-vehicle 12 in order to avoid the caution-area 30, or operate the host-vehicle 12 in order to shrink the caution-area and thereby reduce the risk of collision with the pedestrian 24 if the host-vehicle 12 must pass through the caution area 30. As used herein, the behavior-characteristic 32 determines some aspect of the pedestrian 24 that may be useful to predict or estimate the intent of the pedestrian 24, in particular, the likelihood that the pedestrian 24 may move into or toward a travel-path 34 (FIG. 2) of the host-vehicle 12. As used herein, the travel-path 34 is the area of a roadway 36 that the host-vehicle 12 will occupy or pass-over given a particular steering-path.

Figure 2:
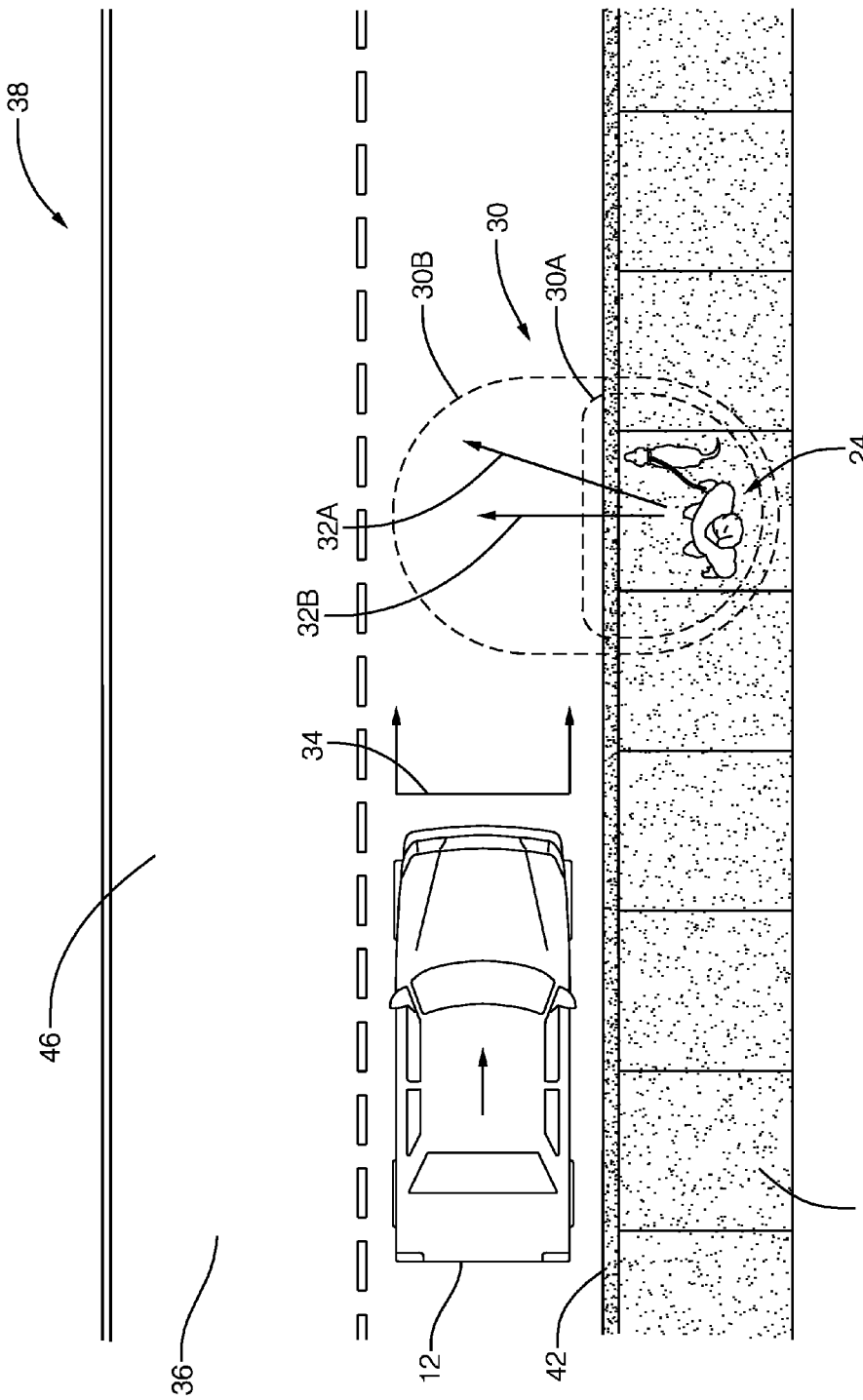
FIG. 2 is a traffic-scenario that the system of FIG. 1 may encounter, in accordance with one embodiment.

FIG. 2 illustrates a non-limiting example of a traffic-scenario 38 that the system 10 or the host-vehicle 12 may encounter where the pedestrian 24 includes a person and a dog that are standing on a sidewalk 40 which is separated from the roadway 36 by a curb 42. As noted above, the object-detection device 20 of the system 10 may include the camera 20A which is generally configured to capture images of the area about the host-vehicle 12, and in particular one or more images of the pedestrian 24. It is advantageous to equip the object-detection device 20 with a camera 20A as suitable examples of the camera 20A are readily available, and it provides a relatively inexpensive high-resolution form of lateral motion detection when compared to other options for equipping the object-detection device 20. The controller 26 may process signals from the camera 20A to extract or detect the detection-characteristic 28 which in this non-limiting example includes an image-shape 28A. The controller 26 may also be configured to determine that the object 22 is a pedestrian when the image-shape 28A corresponds to a human-being or an animal. The process of determining when the image-shape 28A corresponds to a human-being or an animal may be by way of previously mentioned deep-learning techniques or other known image-processing/image-recognition techniques.

By way of further example and not limitation, the behavior-characteristic 32 may include or be defined by a gaze-direction 32A of the pedestrian 24. As used herein, the gaze-direction 32A, which is called head-pose by some, is used to determine or estimate where and/or in what direction the pedestrian 24 is looking. If the pedestrian 24 is looking directly at the host-vehicle 12 so is looking toward the camera 20A on the host-vehicle 12, the image of the head of the pedestrian 24 will typically include a pair of darker areas that correspond to eyes. Alternatively, if the pedestrian is looking in the gaze-direction illustrated in FIG. 2 so no pair of dark areas would be detected, the profile of the pedestrian 24 includes a protrusion that corresponds to a nose of the pedestrian 24.

If the pedestrian is looking at the host-vehicle 12, then caution-area 30 determined by the controller 26 may correspond to the reduced-caution-area 30A, so no action by the system 10 is necessary to alter the travel-path 34 to avoid the reduced-caution-area 30A. The reduced-caution-area 30A may be referred to as a baseline-caution-area, the size and shape of which can be used when the behavior-characteristic 32 strongly suggests that the pedestrian 24 will not, or has no intention of, stepping into the roadway 36. However, if the gaze-direction 32A corresponds to that shown in FIG. 2, then there may be some risk that the pedestrian 24 is not aware of the host-vehicle 12 approaching, so there is some risk that the pedestrian 24 may step towards or into the travel-path 34. Accordingly, the controller 26 is configured to increase the size of the caution-area 30 to correspond to, for example, the enlarged-caution-area 30B when the gaze-direction 32A is not toward the host-vehicle 12.

In response to a determination that the travel-path 34 and the caution-area 30 intersect or share the same portion of the roadway 36, the controller 26 may determine a vehicle-operation 44 such as a revised-steering-path 44A that steers the host-vehicle 12 into an adjacent lane 46 of the roadway when doing so is not precluded by the presence of other-vehicles (not shown), traffic-regulations, obstacles, or the like. Alternatively, or in addition to the revised-steering-path 44A, the controller 26 may determine a reduced-speed 44B for the host-vehicle 12 so that if the pedestrian 24 steps into the travel-path 34, there is time to stop the host-vehicle 12. The effect of the reduced-speed 44B can be characterized as shrinking or reducing the size of the caution-area 30. In other words, if the host-vehicle 12 travels slow enough, a collision with the pedestrian 24 can likely be avoided even if the pedestrian 24 steps into the travel-path 34.

While the description above is generally directed to instance where the system 10 has control of the host-vehicle 12, or takes control from the operator 14, it is contemplated that the system 10 may merely activate the warning device to indicate or point out to the operator 14 the presence of the pedestrian 24 if the detected intent might put the pedestrian in harm's way. It is also contemplated that the warning device may be audible and/or visible to the pedestrian 24. That is, the controller 26 may be configured to operate the horn and/or exterior-lights of the host-vehicle 12 to get the attention of the pedestrian 24.

Alternatively, or in addition to the gaze-direction 32A, the behavior-characteristic 32 may include or be defined by a pose-vector 32B of the pedestrian 24. As used herein, the pose-vector 32B may be determined based on the orientation of the torso (shoulders and/or hips) and/or legs of the pedestrian 24. For example, if the torso is oriented as shown in FIG. 2 so the pose-vector is directed across the roadway 36 and into the travel-path 34 as shown, and/or the legs (not specifically shown) are spaced apart mid-stride in a manner that makes the pedestrian 24 appear to be impatient and/or just about to cross the roadway 36, the controller 26 may increase the caution-area 30 to correspond to the enlarged-caution-area 30B. That is, the controller 26 is configured to increase the size of the caution-area 30 when the pose-vector 32B is not toward the host-vehicle 12. Alternatively, if the torso is oriented toward the host-vehicle 12, or the legs and general posture of the pedestrian 24 indicate that the pedestrian is not about to step into the travel-path 34, then the caution-area 30 may be sized and shaped to correspond to the reduced-caution-area 30A.

By way of further example and not limitation, the behavior-characteristic 32 may include or be defined by a determination that that the pedestrian 24 is engaged in phone-operation 32C. The phone-operation 32C may be indicated by an object with a shape corresponding to a phone being held to an ear of the pedestrian 24, or being viewed by the pedestrian 24. The phone-operation 32C may also be indicated by the posture of the pedestrian 24 includes holding hands forward and head bent down towards the hands as if texting or viewing a phone. If the phone-operation 32C is detected, the controller 26 is configured to increase the size of the caution-area 30 as it is not uncommon that the pedestrian 24 is not aware of the host-vehicle 12 when the phone-operation 32C by the pedestrian 24 is detected.

Figure 3:
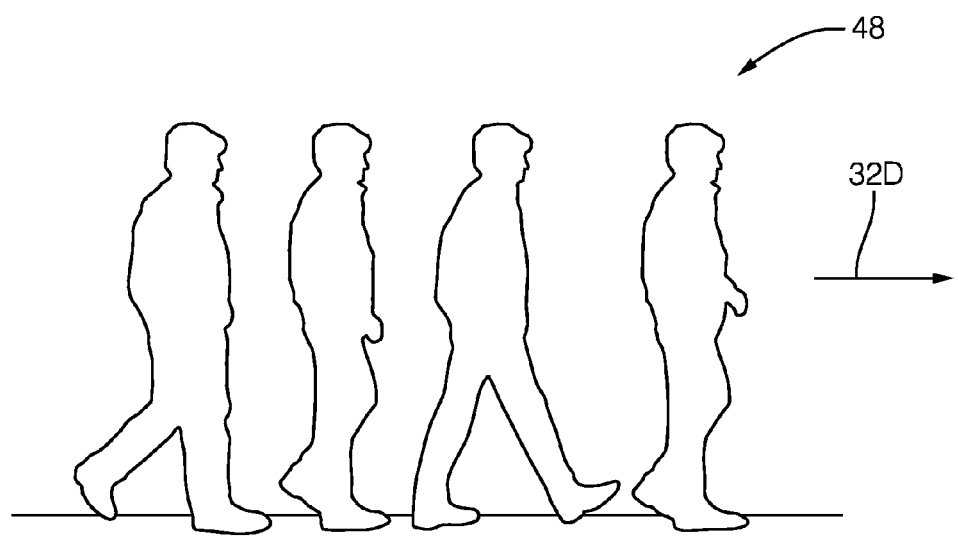
FIG. 3 is an illustration of a walking pedestrian observed by the system of FIG. 1 in accordance with one embodiment.

FIG. 3 illustrates a non-limiting example of a walking-sequence 48 by a person where the legs are illustrated as alternating between being together and being apart as the person walks. In another embodiment of the system 10, the object-detection device 20 may include the radar-sensor 20B which is generally configured to detect radar-signals reflected by the object 22. It was observed that the presence of the pedestrian 24 while walking is often indicated by the presence of a micro-Doppler-signature 28B in the radar-signals. The micro-Doppler-signature 28B arises due to oscillatory movements by the pedestrian 24 such as leg movement. In addition to the frequency information of the bulk motion of an object 22, there are frequency returns associated with structural components of the object such as arms, legs, and torso movements. The structural component movements show as side bands to the bulk motion in the frequency domain. These returns are matched to different types of movement of the pedestrian. Alternating leg movement would appear as an alternating positive and negative frequency return surrounding the bulk frequency return of the pedestrian 24.

Another signature radar return detected by the radar-sensor 20B may correspond to returns that alternate between having the legs aligned so that there generally appears to be a single radar-signal return, and having the legs apart so that there generally appears to be two radar-signal returns. The effect is that the leg furthest from the radar-sensor 20B periodically appears and disappears. As such, when the object-detection device 20 includes a radar-sensor 20B, the detection-characteristic 28 may include the micro-Doppler-signature 28B, and the controller 26 is configured to determine that the object 22 is a pedestrian when the micro-Doppler-signature 28B corresponds to walking or running by a human-being or an animal. In addition to detecting the micro-Doppler-signature 28B, the radar-sensor 20B may also be used to determine a motion-vector 32D of the pedestrian 24. As used herein, the motion-vector 32D is used to generally indicate a direction of travel of the pedestrian 24 relative to the host-vehicle 12. As such, the behavior-characteristic 32 may include a motion-vector 32D of the pedestrian 24, and the controller 26 may be configured to increase the size of the caution-area 30 when the motion-vector 32D intersects the travel-path 34 of the host-vehicle 12. Equipping the object-detection device 20 with a radar-sensor 20B is advantageous as the ability of the radar-sensor 20B to detect the object 22 is less diminished by severe weather (e.g. rain, snow) when compared to the camera 20A and the lidar-sensor 20C. Also, relatively low resolution forms of the radar-sensor 20B are inexpensive and are well suited to detecting movement in a radial direction, i.e. movement towards and away from the radar-sensor 20B.

In another embodiment of the system 10, the object-detection device 20 may include the lidar-sensor 20C which is generally configured to detect lidar returns which may be characterized by some as laser-beams reflected by the object 22. It was observed that the presence of the pedestrian 24 while walking is often indicated by the presence of a leg-motion-signature 28C. Like the radar-sensor 20B, the leg-motion-signature 28C may be the result of the alternating appearance and disappearance of the leg furthest from the lidar-sensor 20C. As such, the detection-characteristic includes the leg-motion-signature 28C, and the controller 26 may be configured to determine that the object 22 is a pedestrian when the leg-motion-signature 28C corresponds to walking or running by a human-being or an animal.

In addition to detecting the micro-Doppler-signature 28B, the lidar-sensor 20C may also be used to determine the motion-vector 32D of the pedestrian 24. As previously explained, the motion-vector 32D is used to generally indicate a direction of travel of the pedestrian 24 relative to the host-vehicle 12, the behavior-characteristic 32 includes a motion-vector 32D of the pedestrian 24, and the controller 26 is configured to increase the size of the caution-area 30 when the motion-vector 32D intersects the travel-path 34 of the host-vehicle 12. It may be advantageous to equip the object-detection device with a lidar-sensor 20C if that is the only device to be used as; at least at the time of this writing, lidar-sensors are relatively expensive. Commercially available examples of the lidar-sensor 20C have enough lateral or angular resolution to be useful for determining the shape of the object 22, and the ability to resolve radial motion, a point on which the camera 20A is weak. However, severe weather can obstruct or inhibit the lidar-sensor 20C.

In another embodiment of the system 10, the object-detection device 20 may include the dedicated-short-range-communications receiver, i.e. the DSRC-receiver 20D. DSRC devices are one-way or two-way short-range to medium-range wireless communication channels generally intended for automotive use with a corresponding set of protocols and standards. For the communications to work, the pedestrian 24 must be equipped with, i.e. carrying, a DSRC-transmitter 50, which can be built into, for example, a smartphone. The DSRC-transmitter 50 would be configured to transmit various types of information such as location 28D and a motion-signal 28E. As used herein, the location 28D may be GPS coordinates, and the motion-signal 28E may be comparable to a pedometer in that detects the walking/running motion of a person carrying the pedometer. Since the detection-characteristic 28 includes the location 28D and the motion-signal 28E transmitted by the DSRC-transmitter 50, the controller 26 may be configured to determine the pedestrian (e.g. range and direction to which pedestrian of multiple pedestrians) who is associated with the DSRC-transmitter 50 at the location 28D when the motion-signal 28E corresponds to walking or running by a human-being.

The location 28D could be tracked to determine a heading 32D (e.g. compass direction). Accordingly, the behavior-characteristic 32 includes the heading 32E of the pedestrian 24, and the controller 26 may be configured to increase the size of the caution-area 30 when the heading 32E intersects a travel-path 34 of the host-vehicle 12. As the heading may be determined relative to the world coordinate frame associated with GPS coordinates, the heading 32E and the location 28D would need to be transformed into the coordinate reference frame of the host-vehicle 12 to determine the caution-area 30. An advantage of using DSRC communications is that the presence of the pedestrian 24 and the size/shape of the caution-area 30 can be determined even if the line of sight from the object-detection device 20 is blocked by, for example, other-people, a building, vegetation, or weather.

As the intent of children may be less predictable than the intent of adults, the controller may be advantageously configured to determine a pedestrian-classification 52 that indicates when the pedestrian 24 is a child, and increase the size of the caution-area 30 when the pedestrian 24 is determined to be a child. An object-detection device 20 that included both the camera 20A and the radar-sensor 20B would be able to determine when the pedestrian 24 is a child because the radar-sensor 20B can accurately determine range, so the absolute height of the pedestrian 24 can then be determine from an image provided by the camera 20A. Also, the camera 20A itself could determine when the pedestrian 24 is a child based on the image-shape 28A as young children tend to have a distinctive gate when they walk and have distinctive body-portion dimension relationships when compared to adults. As suggested above, deep learning techniques can also be used to 'teach' the controller 26 how to distinguish an adult from a child.

As another example, the controller 26 may detect that a second-object (not shown) other than a person (e.g. pet, ball, bicycle, baby-carriage, wheel-chair, grocery-cart) is being followed or pushed by the pedestrian 24 (adult or child). While the pedestrian 24 may not be too close to the travel-path 34, the controller 26 may be configured to determine when the pedestrian 24 is following the second-object, and increase the size of the caution area 30 to include the second-object. For example, if the pedestrian 24 is pushing a grocery-cart, but the line-of-site to the pedestrian 24 is partially obstructed so the micro-Doppler-signature 28B and/or the leg-motion-signature 28C cannot be determined, the size/shape of the caution-area 30 may be extended forward of the grocery-cart and the host-vehicle 12 operated accordingly.

Accordingly, a pedestrian-intent-detection system for automated operation of a host-vehicle (the system 10), and a controller 26 for the system 10 are provided. The system 10 described herein can make use of a variety of means to detect and characterize an object 22, determine if the object is a pedestrian 24, determine an intent of the pedestrian 24, and define a caution-area 30 around the pedestrian 30 that host-vehicle 12 avoids or may travel through at a reduced-speed so the risk of a collision between the pedestrian 24 and the host-vehicle 12 is reduced.

While this invention has been described in terms of the preferred embodiments thereof, it is not intended to be so limited, but rather only to the extent set forth in the claims that follow.

We claim:

1. A pedestrian-intent-detection system for automated operation of a host-vehicle, said system comprising:
   an object-detection device operable to detect an object proximate to a host-vehicle; and
   a controller in communication with the object-detection device, said controller configured to
   determine when the object detected by the object-detection device is a pedestrian based on a detection-characteristic of the pedestrian indicated by the object-detection device,
   define a size of a caution-area located proximate to the pedestrian based on a behavior-characteristic of the pedestrian indicated by the object-detection device, and
   operate the host-vehicle in order to avoid the caution-area, wherein the behavior-characteristic includes a gaze-direction of the pedestrian, and the controller is configured to increase the size of the caution-area when the gaze-direction is not toward the host-vehicle.

2. The system in accordance with claim 1, wherein the object-detection device includes a camera, the detection-characteristic includes an image-shape, and the controller is configured to determine that the object is a pedestrian when the image-shape corresponds to a human-being or an animal.

3. A pedestrian-intent-detection system for automated operation of a host-vehicle, said system comprising:
   an object-detection device operable to detect an object proximate to a host-vehicle; and
   a controller in communication with the object-detection device, said controller configured to
   determine when the object detected by the object-detection device is a pedestrian based on a detection-characteristic of the pedestrian indicated by the object-detection device,
   define a size of a caution-area located proximate to the pedestrian based on a behavior-characteristic of the pedestrian indicated by the object-detection device, and
   operate the host-vehicle in order to avoid the caution-area, wherein the behavior-characteristic includes a pose-vector of the pedestrian, and the controller is configured to increase the size of the caution-area when the pose-vector is not toward the host-vehicle.

4. The system in accordance with claim 3, wherein the object-detection device includes a camera, the detection-characteristic includes an image-shape, and the controller is configured to determine that the object is a pedestrian when the image-shape corresponds to a human-being or an animal.

5. A pedestrian-intent-detection system for automated operation of a host-vehicle, said system comprising:
   an object-detection device operable to detect an object proximate to a host-vehicle; and
   a controller in communication with the object-detection device, said controller configured to
   determine when the object detected by the object-detection device is a pedestrian based on a detection-characteristic of the pedestrian indicated by the object-detection device,
   define a size of a caution-area located proximate to the pedestrian based on a behavior-characteristic of the pedestrian indicated by the object-detection device, and
   operate the host-vehicle in order to avoid the caution-area, wherein the behavior-characteristic includes phone-operation by the pedestrian, and the controller is configured to increase the size of the caution-area when phone-operation by the pedestrian is detected.

6. The system in accordance with claim 5, wherein the object-detection device includes a camera, the detection-characteristic includes an image-shape, and the controller is configured to determine that the object is a pedestrian when the image-shape corresponds to a human-being or an animal.

7. A pedestrian-intent-detection system for automated operation of a host-vehicle, said system comprising:
   an object-detection device operable to detect an object proximate to a host-vehicle; and
   a controller in communication with the object-detection device, said controller configured to
   determine when the object detected by the object-detection device is a pedestrian based on a detection-characteristic of the pedestrian indicated by the object-detection device,
   define a size of a caution-area located proximate to the pedestrian based on a behavior-characteristic of the pedestrian indicated by the object-detection device, and operate the host-vehicle in order to avoid the caution-area, wherein the controller is configured to determine when the pedestrian is a child, and increase the size of the caution-area when the child is determined.

8. A pedestrian-intent-detection system for automated operation of a host-vehicle, said system comprising:
an object-detection device operable to detect an object proximate to a host-vehicle; and
a controller in communication with the object-detection device, said controller configured to
determine when the object detected by the object-detection device is a pedestrian based on a detection-characteristic of the pedestrian indicated by the object-detection device,
define a size of a caution-area located proximate to the pedestrian based on a behavior-characteristic of the pedestrian indicated by the object-detection device, and
operate the host-vehicle in order to avoid the caution-area, wherein the controller is configured to determine when the pedestrian is following a second-object, and increase the size of the caution area to include the second-object.

9. A pedestrian-intent-detection system for automated operation of a host-vehicle, said system comprising:
an object-detection device operable to detect an object proximate to a host-vehicle; and
a controller in communication with the object-detection device, said controller configured to
determine when the object detected by the object-detection device is a pedestrian based on a detection-characteristic of the pedestrian indicated by the object-detection device,
define a size of a caution-area located proximate to the pedestrian based on a behavior-characteristic of the pedestrian indicated by the object-detection device, and
operate the host-vehicle in order to avoid the caution-area, wherein the object-detection device includes a radar-sensor, the detection-characteristic includes a micro-Doppler-signature, and the controller is configured to determine that the object is a pedestrian when the micro-Doppler-signature corresponds to walking or running by a human-being or an animal.

10. The system in accordance with claim 9, wherein the behavior-characteristic includes a motion-vector of the pedestrian, and the controller is configured to increase the size of the caution-area when the motion-vector intersects a travel-path of the host-vehicle.

11. A pedestrian-intent-detection system for automated operation of a host-vehicle, said system comprising:
an object-detection device operable to detect an object proximate to a host-vehicle; and
a controller in communication with the object-detection device, said controller configured to
determine when the object detected by the object-detection device is a pedestrian based on a detection-characteristic of the pedestrian indicated by the object-detection device,
define a size of a caution-area located proximate to the pedestrian based on a behavior-characteristic of the pedestrian indicated by the object-detection device, and
operate the host-vehicle in order to avoid the caution-area, wherein the object-detection device includes a lidar-sensor, the detection-characteristic includes a leg-motion-signature, and the controller is configured to determine that the object is a pedestrian when the leg-motion-signature corresponds to walking or running by a human-being or an animal.

12. The system in accordance with claim 11, wherein the behavior-characteristic includes a motion-vector of the pedestrian, and the controller is configured to increase the size of the caution-area when the motion-vector intersects a travel-path of the host-vehicle.

13. A pedestrian-intent-detection system for automated operation of a host-vehicle, said system comprising:
an object-detection device operable to detect an object proximate to a host-vehicle; and
a controller in communication with the object-detection device, said controller configured to
determine when the object detected by the object-detection device is a pedestrian based on a detection-characteristic of the pedestrian indicated by the object-detection device,
define a size of a caution-area located proximate to the pedestrian based on a behavior-characteristic of the pedestrian indicated by the object-detection device, and
operate the host-vehicle in order to avoid the caution-area, wherein the object-detection device includes a dedicated-short-range-communications receiver (DSRC-receiver), the detection-characteristic includes a location and a motion-signal transmitted by a DSRC-transmitter, and the controller is configured to determine the pedestrian associated with the DSRC-transmitter at the location when the motion-signal corresponds to walking or running by a human-being.

14. The system in accordance with claim 13, wherein the behavior-characteristic includes a heading of the pedestrian, and the controller is configured to increase the size of the caution-area when the heading intersects a travel-path of the host-vehicle.

* * * * *